(12) United States Patent
Chawla et al.

(10) Patent No.: US 11,681,455 B2
(45) Date of Patent: Jun. 20, 2023

(54) SHADOW LIVE MIGRATION OVER A SMART NETWORK INTERFACE CARD

(71) Applicant: Dell Products L.P., Round Rock, TX (US)

(72) Inventors: Gaurav Chawla, Austin, TX (US); William P. Dawkins, Lakeway, TX (US); Hendrich Hernandez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 17/383,023

(22) Filed: Jul. 22, 2021

(65) Prior Publication Data

US 2023/0029074 A1    Jan. 26, 2023

(51) Int. Cl.
*G06F 3/06* (2006.01)
*G06F 11/07* (2006.01)
*G06F 11/10* (2006.01)

(52) U.S. Cl.
CPC .......... *G06F 3/0647* (2013.01); *G06F 3/0619* (2013.01); *G06F 3/0659* (2013.01); *G06F 3/0664* (2013.01); *G06F 3/0683* (2013.01); *G06F 11/0757* (2013.01); *G06F 11/1064* (2013.01)

(58) Field of Classification Search
CPC .... G06F 3/0647; G06F 3/0619; G06F 3/0659; G06F 3/0664; G06F 3/0683; G06F 11/0757; G06F 11/1064
See application file for complete search history.

(56) References Cited

U.S. PATENT DOCUMENTS

| | | | |
|---|---|---|---|
| 9,652,326 B1 * | 5/2017 | Bauer | G06F 11/2035 |
| 10,498,645 B2 | 12/2019 | Chandrasekhar et al. | |
| 11,010,084 B2 | 5/2021 | Dawkins et al. | |
| 11,372,589 B2 * | 6/2022 | Li | G06F 3/0659 |
| 2012/0110593 A1 | 5/2012 | Cherian et al. | |
| 2014/0032959 A1 | 1/2014 | Dawkins et al. | |
| 2015/0324236 A1 * | 11/2015 | Gopalan | G06F 3/0619 |
| | | | 711/162 |
| 2020/0257456 A1 * | 8/2020 | Guim Bernat | G06F 9/4881 |
| 2021/0375332 A1 * | 12/2021 | Akamatsu | G11C 5/147 |
| 2021/0382797 A1 * | 12/2021 | Tatiparthi | G06F 9/45558 |
| 2022/0188007 A1 * | 6/2022 | Roberts | G06F 3/0604 |

* cited by examiner

*Primary Examiner* — Masud K Khan
(74) *Attorney, Agent, or Firm* — Larson Newman, LLP

(57) ABSTRACT

A smart network interface card in an information handling system monitors a local host memory associated with a computer resource for an update to a memory page in the local host memory. After the update to the memory page, the smart network interface card copies the memory page to its memory. The smart network interface card sets a watchdog timer to detect a failure in an the information handling system that hosts the computer resource and if the failure is detected, then the smart network interface card migrates the computer resource from its to another information handling system.

20 Claims, 6 Drawing Sheets

SHADOW LIVE MIGRATION OVER A SMART NETWORK INTERFACE CARD

FIELD OF THE DISCLOSURE

The present disclosure generally relates to information handling systems, and more particularly relates to shadow live migration over a smart network interface card.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A smart network interface card in an information handling system monitors a local host memory associated with a computer resource for an update to a memory page in the local host memory. After the update to the memory page, the smart network interface card copies the memory page to its memory. The smart network interface card sets a watchdog timer to detect a failure in an the information handling system that hosts the computer resource and if the failure is detected, then the smart network interface card migrates the computer resource from its to another information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
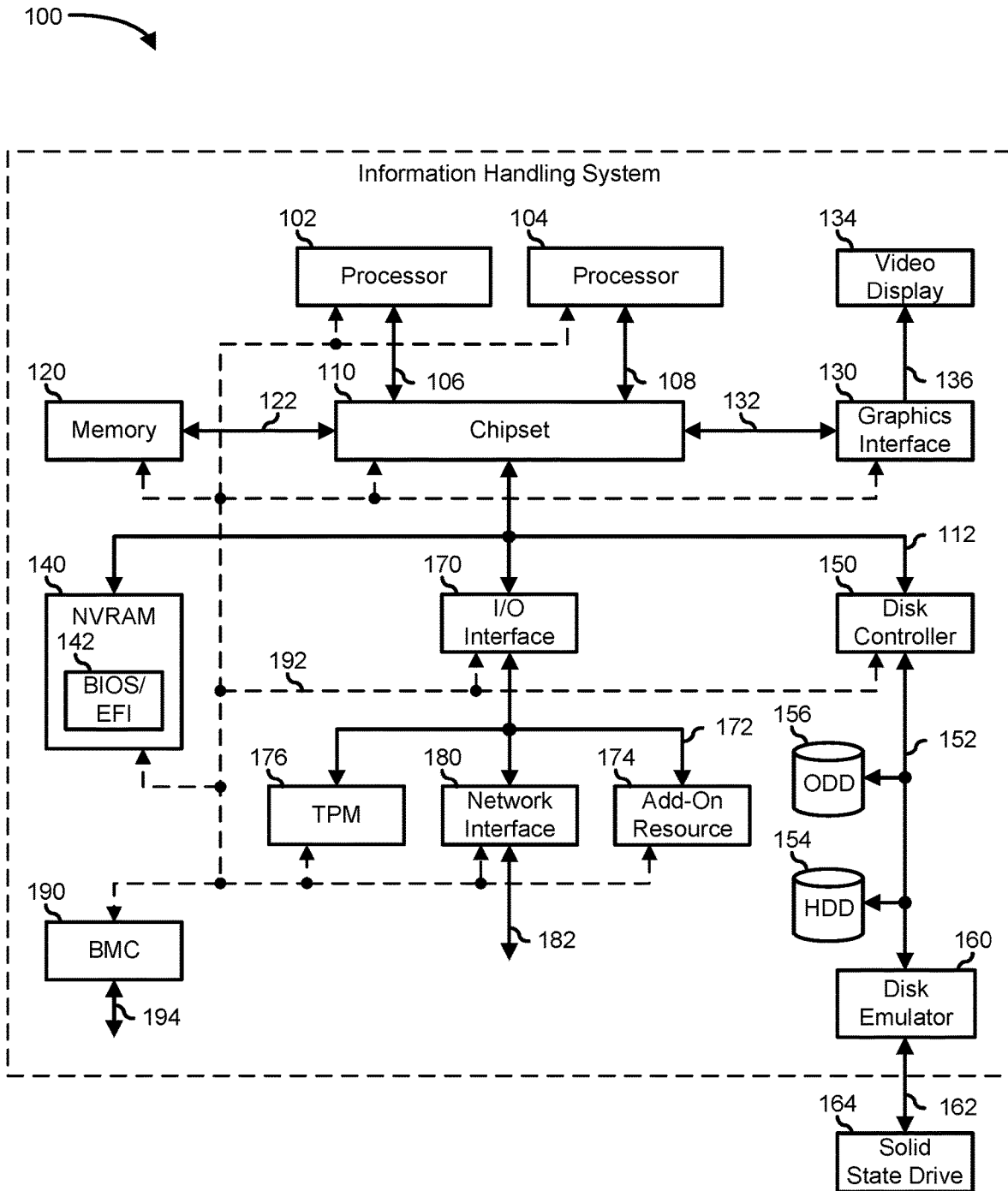
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a distinct or separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Information handling systems, such as servers, are sometimes utilized to host virtual machines. Virtual machines may be deployed on servers when they are needed, and then removed from the server when they are no longer needed. In some situations, it is beneficial to migrate a virtual machine operating on one server to another server. Live migration enables a virtual computer to be moved from one physical host server to another, while it is running and with no interruption in service. For example, the virtual machine may be migrated because the server hosting the virtual machine requires maintenance or an upgrade that would interrupt the operation of the virtual machine, and/or other situations.

Typically, live migration uses the CPU for data transfer and interrupt handling which translates to additional overhead. In addition, the live migration process typically requires that the hypervisor is running to copy the memory pages and transfer them to the destination host over the network. Live migration without the overhead of the CPU and the requirement of the hypervisor running may be desirable. As such, the present disclosure provides a system and method to perform shadow live migration over a smartNIC. Because the shadow live migration intelligence is embedded in the smartNICs the impact on the performance of the hypervisor during the live migration process may be reduced. In addition, because the smartNICs have separate power domains which allow the live migration process to proceed even when the server fails.

Figure 2:
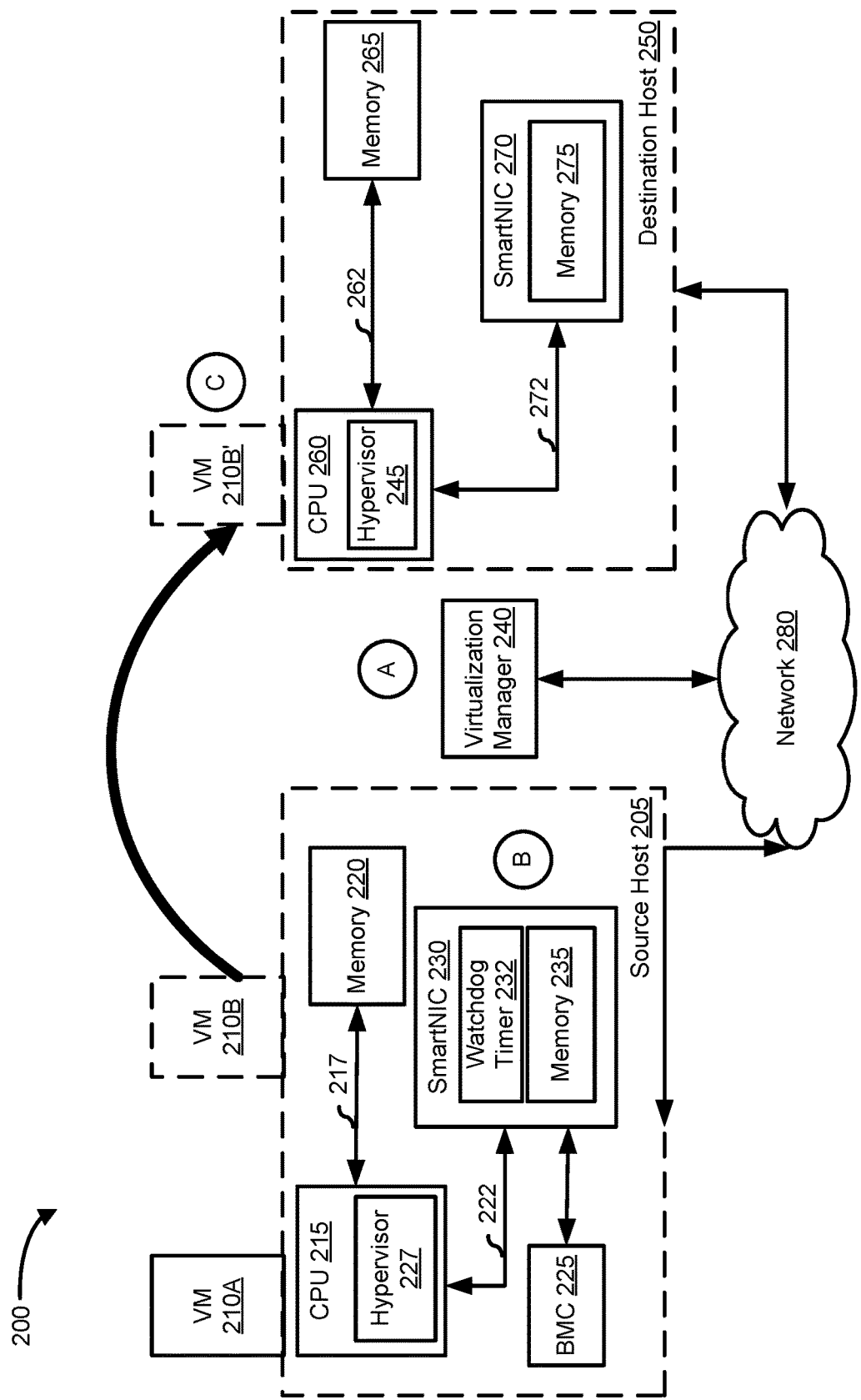
FIG. 2 is a block diagram illustrating an example of an environment for shadow live migration over a smart network interface card (smartNIC), according to an embodiment of the present disclosure.

FIG. 2 shows an environment 200 configured for shadow live migration, also referred to as live migration from here, over a smart network interface card (smartNIC). Environment 200 includes a source host 205, a destination host 250, and a virtualization manager 240 communicatively coupled via a network 280. Source host 205 includes a CPU 215, a hypervisor 227, a memory 220, a BMC 225, and a smartNIC 230 that includes a watchdog timer 232 and a memory 235. Source host 205 also includes a virtual machine (VM) 210A and VM 210B while CPU 215 includes a hypervisor 227. Destination host 250 includes a CPU 260, a memory 265, and a smartNIC 270 that includes a memory 275. CPU 260 includes a hypervisor 245. Source host 205 and destination host 250 are similar to information handling system 100 of FIG. 1. The components of environment 200 may be implemented in hardware, software, firmware, or any combination thereof. The components shown are not drawn to scale and environment 200 may include additional or fewer components. In addition, connections between components may be omitted for descriptive clarity.

Virtualization manager 240 is designed to provision, manage, and configure virtual information technology environments. In this example, virtualization manager 240 provisions, configures, and manages virtual machines in source host 205 and destination host 250. CPU 215 and CPU 260 may each include a hypervisor that abstracts a processor, memory, storage, and other physical resources into one or more virtual machines such as VM 210A, VM 210B, and VM 210B'. The hypervisors may also be configured to associate each virtual machine with one or more local memory systems. For example, hypervisor 245 may provision VM 210A and associate it with a system or local host memory such as memory 220. Once provisioned, data associated with VM 210A may be stored in memory 220 and accessed by VM 210A during operation. Similarly, hypervisor 245 may also provision VM 210B and associate it will memory 220. Once provisioned, data associated with VM 210B may be stored in memory 220 and accessed by VM 210B during operation. Memory 220, which is similar to memory 120 of FIG. 1, may be a DRAM device, NV-RAM device, non-volatile memory express (NVMe) device, and/or other memory device. Memory 265 may be similar to memory 220. Memory 235 and memory 275 may be similar devices to memory 220 but instead of being a system memory, memory 235 and memory 275 are associated with smartNIC 230 and smartNIC 270 respectively. Thus, memory 235 and memory 275 may also be referred to as smartNIC memory. BMC 225 may be configured to manage smartNIC 230 and its components such as watchdog timer 232 and memory 235.

SmartNIC 230 and smartNIC 270 are programmable network interface cards having processing capability, storage capacity, and separate power domains, wherein, the PCIe slots that smartNIC 230 and smartNIC 270 are plugged into may be associated with a different power source from the host such that even if the host losses power smartNIC 230 and smartNIC 270 do not lose power. For example, if source host 205 losses power, then smartNIC 230 may still have power. Similarly, even if destination host 250 losses power, smartNIC 270 may still have power. In addition, smartNIC 230 and smartNIC 270 can be independently power-cycled from source host 205 and destination host 250 respectively.

SmartNIC 230 and smartNIC 270 may be configured to have visibility and access of the virtual machines and their associated memory running in the server. Here, smartNIC 230 has visibility of VM 210A and VM 210B and access their memory pages located at memory 220. SmartNIC 230 may have access to memory 220 via interfaces 222 and 217 between CPU 215, memory 220, and smartNIC 230. Interfaces 222 and 217 may be PCIe interfaces, compute express link (CXL) interfaces, etc. which provide CPU-to-device and CPU-to-memory interconnect. SmartNIC 230 may communicate with CPU 215 and access memory 220 directly by using the CXL link. Otherwise, hypervisor 245 may be configured to access memory 220 on behalf of smartNIC 230. One or more interfaces similar to interface 222 could be mapped to a virtual machine for access by the smartNIC, hypervisor, CPU, etc. These interface(s) can be used during the live migration of the virtual machine. SmartNIC 230 may be configured to perform a checkpoint of VM 210A and VM 210B providing a "shadow copy" which is a backup copy of VM 210A and VM 210B at another location, wherein smartNIC 270 may capture a version of VM 210A and VM 210B for storage at a second location such as memory 235.

In one embodiment, smartNIC 230 may be configured to copy or mirror a portion of memory 220 that is associated with VM 210A and VM 210B to memory 235 at each update of memory data associated with VM 210A and VM 210B. That is, the local memory and machine states associated with VM 210B are mirrored to memory 235. Machine states include processor register contents, processor status, non-pageable memory contents, processor cache contents, or other machine states. SmartNIC 230 may perform the copy as a background service.

In an embodiment, the portion of memory 220 associated with VM 210A and VM 210B may be copied in any suitable manner. In an example, hypervisor 227 may establish a dirty page map for the shared memory regions of memory 220 where the memory ranges of VM 210A and VM 210B reside. The shared memory 220 may be divided up into allocation units where each bit in the dirty page map may be associated to a corresponding allocation unit in memory 220. As VM 210A and VM 210B write to their respective memory ranges, hypervisor 227 updates the dirty page map to indicate that VM 210A and VM 210B have updated a given memory allocation unit. The hypervisor may set a bit in the dirty page map to one to indicate that a give allocation unit in memory 220 has been written. SmartNIC 230 may read the dirty page map to determine which allocation units in memory 220 have been updated. SmartNIC 230 may copy allocation units in memory 220 with corresponding dirty page map bits set to one to memory 235. As SmartNIC 230 copies allocation units from memory 230, it sets the corresponding dirty page map bits to zero. In another embodiment, hypervisor 227 may send smartNIC 230 a list of memory pages that have been updated since the last time they were copied.

Watchdog timer 232 may be configured to detect a component failure, such as a hardware failure, hypervisor failure, virtual machine failure, etc. utilizing a heartbeat mechanism. With the heartbeat mechanism, the component may periodically broadcast a heartbeat message indicating that the component is up. Watchdog timer 232 may be set by smartNIC 230 to monitor for the failure of one or more components of source host 205 which may be detected when watchdog timer 232 times out. Watchdog timer 232 may timeout if it does not receive a heartbeat indication from the component. The timeout may then trigger a switchover phase, wherein the virtual machine is migrated to a destination host. More than one watchdog timer may be implemented. In addition, although watchdog timer 232 is shown as part of smartNIC 230, watchdog timer 232 may be part of other components of source host 205. For example, watchdog timer 232 may be part of hypervisor 245 or BMC 225.

When an instruction is received for live migration or a trigger associated with a failure in source host 205 is detected, smartNIC 230 may initiate the replication or the live migration process of one or more virtual machines to a destination server. Here, smartNIC 230 may initiate the live migration of VM 210B to a destination server which may be determined during or prior to the live migration. Here, destination host 250 has been determined to be the destination server, and then smartNIC 230 may proceed with the live migration of VM 210B to destination host 250 by copying memory data or memory page(s) associated with VM 210B from memory 235 to memory 275.

Prior to initiating the live migration, smartNIC 230 may stop the operation of VM 210B and send a command to hypervisor 227 to suspend or terminate the copy of the memory pages from memory 220 to memory 235. In addition, smartNIC 230 may also proceed to copy the remaining dirty memory pages to memory 235 before or after the suspension or termination. SmartNIC 230 may then coordinate with smartNIC 270 and proceed to migrate memory data associated with VM 210B from memory 235 to memory 275 via network 280. If destination host 250 does not have a smartNIC, then smartNIC 230 may coordinate with hypervisor 245. After migrating VM 210B, smartNIC 270 of destination host 250 may proceed to start VM 2103. SmartNIC 230 may also notify virtualization manager 240 of the live migration. In another embodiment, smartNIC 270 or a component of destination host 250 such as hypervisor 245 may notify virtualization manager 240 of the live migration.

In one embodiment, the memory and machine state associated with VM 210B is not copied to destination host 250 until after receiving the instruction to migrate and/or detecting a failure, such as failure of source host 205, hypervisor 245, etc. In another embodiment, smartNIC 230 may be configured to also copy the memory data associated with VM 210A and VM 210B to memory 235 at each update. In addition, a destination server may have been determined and before copying or mirroring. Here, the portion of memory 220 that is associated with VM 210A and VM 210B may also copied to memory 275. That is, the local memory and machine states associated with VM 210A and VM 210B are mirrored to memory 235 and memory 275. In the second embodiment, the memory and machine state associated with VM 210B may be continuously copied to destination host 250 before receiving the instruction to migrate and/or detecting a failure. As such, when an instruction is received or a trigger detected for a virtual machine like VM 210B to be replicated or migrated at destination host 250, smartNIC 230 may proceed to migrate the remaining dirty pages to memory 235 and/or memory 275. Because smartNIC 230 has continuously copied the data associated with VM 210A and VM 210B to memory 275, VM 210B' may be restarted with less delay as compared to copying the data to memory 275 after detecting failure of host 205.

Here, an administrator may have an option to determine the frequency of the differential copies of the memory and machine state. The lesser the frequency of the differential copies, the size of the portions of the memory to be copied may be larger than if the differential copy of the memory and machine state is more frequent. This allows the administrator to determine how much network overhead versus how much delay is to be tolerated in restarting the virtual machine at the destination server. As such, as the frequency of the differential copy is increased, the network overhead is increased but the virtual machine may be restarted at the destination server with less delay during a switchover phase because the remaining portion of the memory to be copied may be smaller. The switchover phase refers to a process that allows the switchover of the server hosting the virtual machine from a first server to a second server. In comparison, as the frequency of the differential copy is decreased, the network overhead is also decreased but the virtual machine may be restarted at the destination server with more delay because the remaining portion of the memory to be copied may be bigger.

FIG. 2 is annotated with a series of letters A, B, and C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, an administrator enables the smartNIC shadow live migration feature via virtualization manager 240. The smartNIC shadow live migration feature, also referred herein as shadow live migration may be enabled on one or more virtual machines. This may establish an asynchronous replication between a source host and a destination host also referred to as a target host. At this point, the administrator may also identify the destination host for the virtual machines should an issue arise with the source or current host. Here, the administrator enabled the smartNIC shadow live migration feature on VM 210B at source host 205 and selected destination host 250 as the destination host. At stage B, smartNIC 230 caches the latest memory copy of VM 210B at memory 235. At stage C, if a failure is associated with source host 205, hypervisor 245, memory 220, or other components that affect VM 210B, then VM 210B is migrated from source host 205 to destination host 250 as VM 210B'.

Those of ordinary skill in the art will appreciate that the configuration, hardware, and/or software components of environment 200 depicted in FIG. 2 may vary. For example, the illustrative components within environment 200 are not intended to be exhaustive, but rather are representative to highlight components that can be utilized to implement aspects of the present disclosure. For example, other devices and/or components may be used in addition to or in place of the devices/components depicted such that while two servers are illustrated and discussed above, the present disclosure will recognize that many more servers may be part of environment 200. The depicted example does not convey or imply any architectural or other limitations with respect to the presently described embodiments and/or the general disclosure. For example, although destination host 250 includes smartNIC 270, the destination host does not necessarily need to have a smartNIC. In this scenario, smartNIC 230 would coordinate with hypervisor 245 instead of smartNIC 270 during the live migration of VM 210B. In the discussion of the figures, reference may also be made to components illustrated in other figures for continuity of the description.

Figure 3:
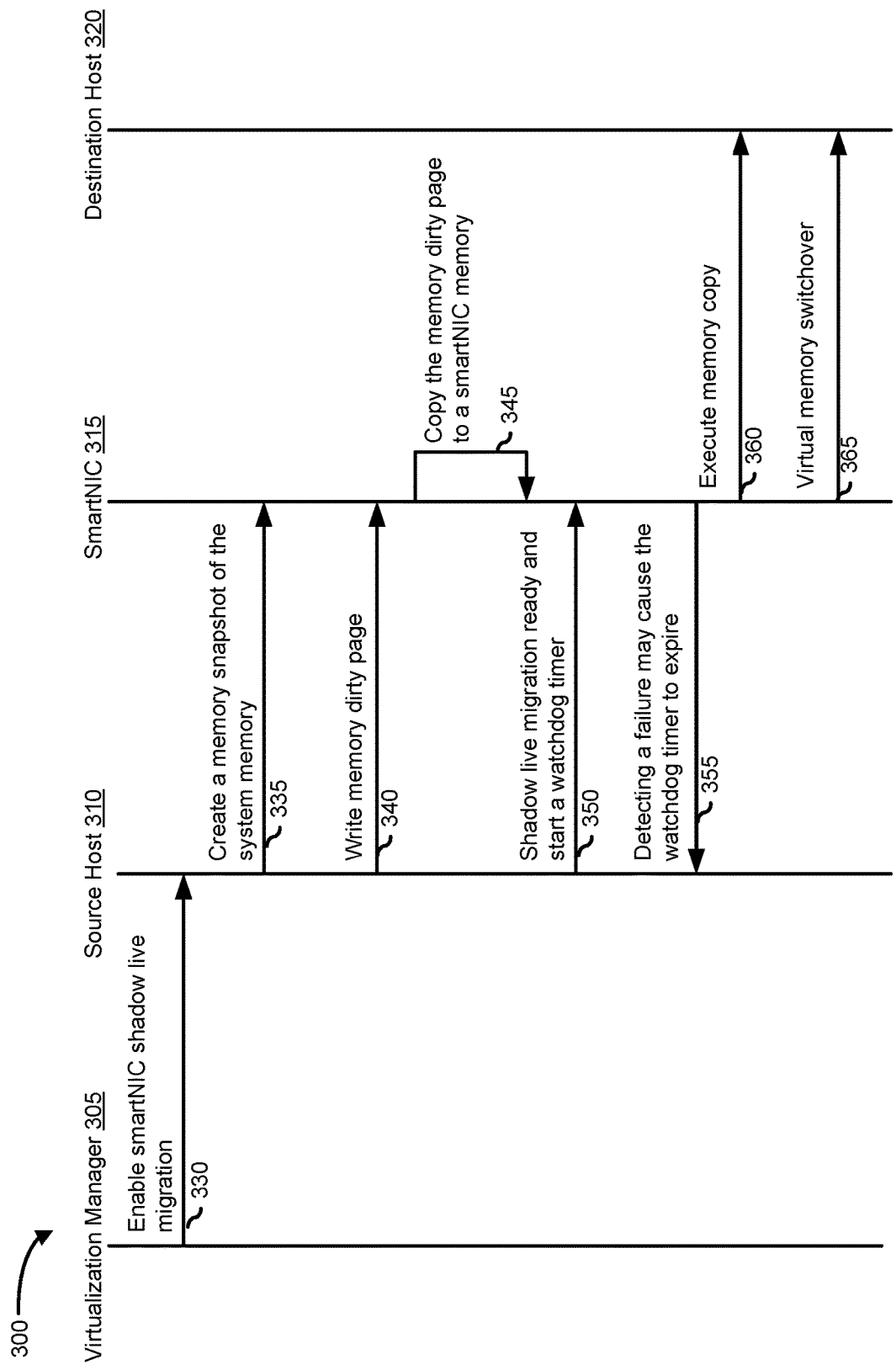
FIG. 3 is a flow diagram illustrating an example of a method for shadow live migration over a smartNIC, according to an embodiment of the present disclosure.

FIG. 3 illustrates a method 300 for shadow live migration over a smartNIC. Method 300 may be performed by virtualization manager 305, source host 310, smartNIC 315, and destination host 320. While embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

Method 300 typically starts at 330 where an administrator at virtualization manager 305 enables shadow live migration for one or more virtual machines at source host 310. The administrator may also determine or identify a destination host wherein one or more virtual machines would be replicated or migrated to. At 335, source host 310 takes a snapshot of the system memory, wherein source host 310 may take a snapshot of the memory contents associated with the virtual machines.

At 340, source host 310 writes memory dirty pages in a memory location which may be a shared memory region. A memory dirty page may be a memory page that has been modified. The memory location may be associated with a bitmap such that if a virtual machine memory is updated, a corresponding bit in the bitmap is updated. The memory may be divided up into allocation units. Each allocation unit may be associated with the corresponding bit in the bitmap. The bit may be set to zero if the allocation unit is has been copied and one if the allocation unit has been updated or vice versa. In another embodiment, the hypervisor may send the smartNIC a list of memory pages that have been updated since the last time they were cleared.

At 345, smartNIC 315 maybe checking the bitmap periodically to determine if there is any update. If there is an update, then smartNIC 315 clears the bit in the bitmap and copies the updated memory pages from the system memory to a smartNIC 315 memory. This way, smartNIC 315 may be able to copy the memory page again if the memory page was updated again while smartNIC 315 was in the process of copying the initial updated memory page. In another embodiment, the hypervisor may be configured to copy the updated memory page to the memory associated with smartNIC 315.

At 350, source host 310 indicates the shadow live migration is ready to replicate or migrate the virtual machine and starts a watchdog timer. The shadow live migration may be ready during the copy of the memory dirty pages and the watchdog timer may also be started at this point. After smartNIC 315 is finished with copying the dirty memory pages, it coordinates with source host 310 to start the watchdog time which may run on both smartNIC 315 and source host 310. The watchdog timer may monitor the system memory, hypervisor, and/or the information handling system that hosts the virtual machine to determine if there is a failure. There may be more than one watchdog timer such that one is associated with the system memory, another with the hypervisor, and yet another with the host of the virtual machine. For example, the watchdog timer associated with the virtual machine may have a heartbeat that checks on the virtual machine to make sure it has not crashed or failed.

At block 355, if one of the watchdog timer(s) detects a failure, such as an operating system failure, the watchdog timer may expire. The expiration of the watchdog timer may trigger a live migration of the virtual machine at 360 where smartNIC 315 executes a memory copy of the virtual machine memory data from the source host 310 to a smartNIC memory in destination host 320. If smartNIC 315 detects a failure, such as a host failure, a hypervisor failure, or a virtual machine failure, then smartNIC 315 may initiate a switchover phase. If source host 310 detects failure of smartNIC 315, then source host 310 may stop setting the dirty pages in the bitmap and stop exception handling of the memory writes. Source host 310 may also stop the shadow live migration of memory 220 to memory 235. For example, source host 310 may bring the status of the virtual machines to normal.

SmartNIC 315 may coordinate with the hypervisor in source host 310 and/or smartNIC in destination host 320 to initiate the live migration of the virtual machine to destination host 320. The memory data associated with the virtual machine at the local memory of smartNIC 315 is copied to the local memory of the smartNIC at the destination host. The smartNIC at the destination host may then copy the memory data associated with the virtual machine to a local memory of destination host 320. At 365, smartNIC 315 performs a virtual memory switchover, wherein the replicated or migrated virtual machine in the destination host may then start and operate using the virtual machine data that has been copied over to the local memory location in destination host 320.

Figure 4:
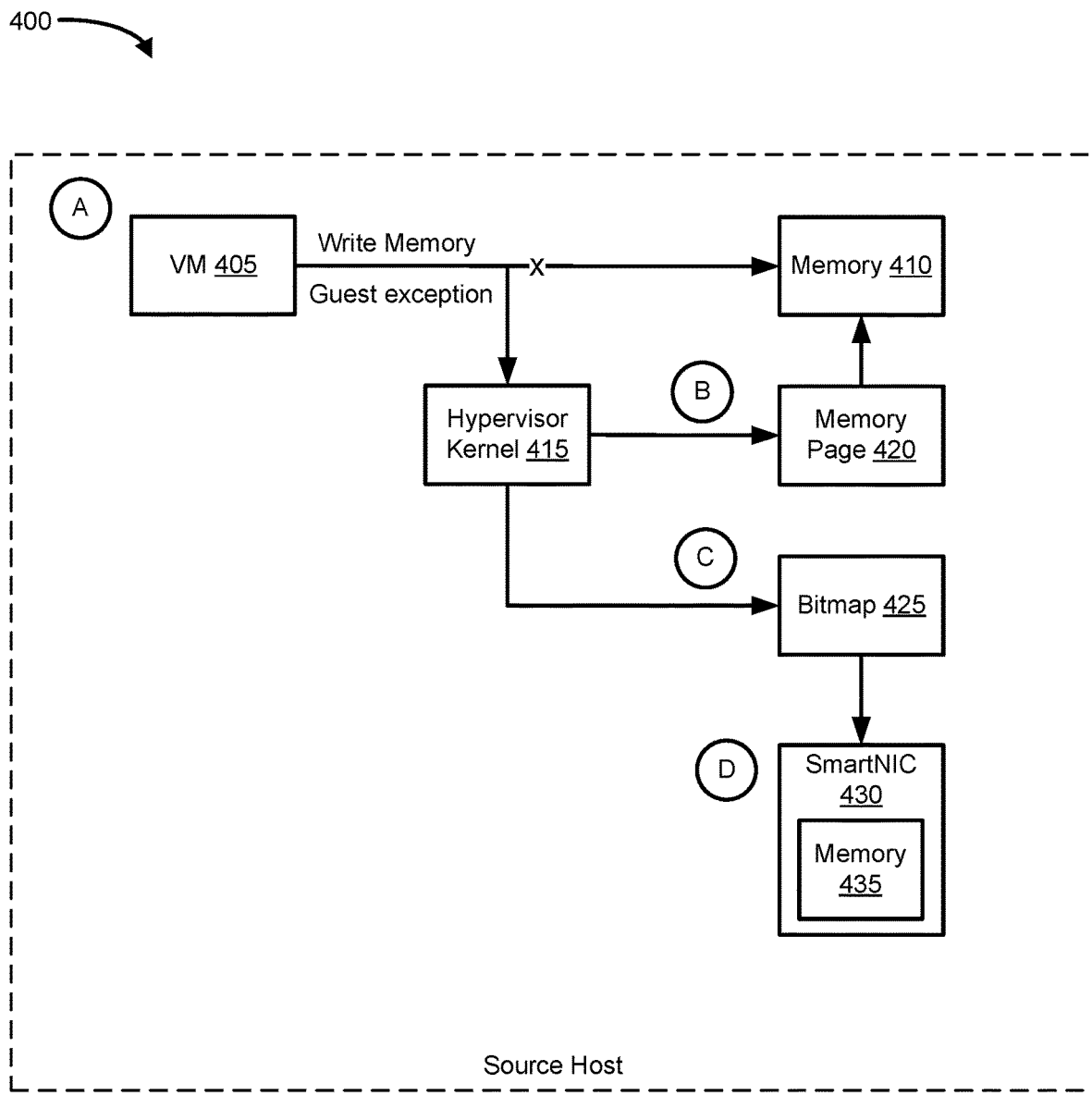
FIG. 4 is a block diagram illustrating an example of a system for memory writes of shadow live migration over a smartNIC, according to an embodiment of the present disclosure.

FIG. 4 shows a source host 400 configured for shadow live migration over a smartNIC. In particular, source host 400 includes a VM 405, a memory 410, a hypervisor kernel 415, a memory page 420, a bitmap 425, and a smartNIC 430, that includes a memory 435. VM 405 is similar to VM 210A and VM 210B while memory 410 is similar to memory 220 and memory 435 is similar to memory 235 of FIG. 2. Here, smartNIC 430 is configured to cache the latest memory copy of the virtual machine.

FIG. 4 is annotated with a series of letters A, B, C, and D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, an attempt to write to memory 410 of the virtual machine may generate a guest exception or kernel exception and control may be transferred to the virtual machine monitor (VMM) kernel also referred to as hypervisor kernel 415. This is in contrast to memory reads, which VM 405 can perform on memory 410 without generating a guest exception or kernel exception. At stage B, hypervisor kernel 415 then executes a write to a memory page 420 which may be a part of memory 410. At stage C, hypervisor kernel 415 also updates bitmap 425 to identify a memory "dirty page". In particular, hypervisor kernel 415 may update a bit in bitmap 425, which could be a thirty-bit bitmap, to indicate that memory page 420 has been updated. In one embodiment, hypervisor kernel 415 may receive an instruction from smartNIC 430 to setup up bitmap 425 prior to the update. At stage D, smartNIC 430 clears bitmap 425 and copies memory page 420 to memory 435.

Figure 5:
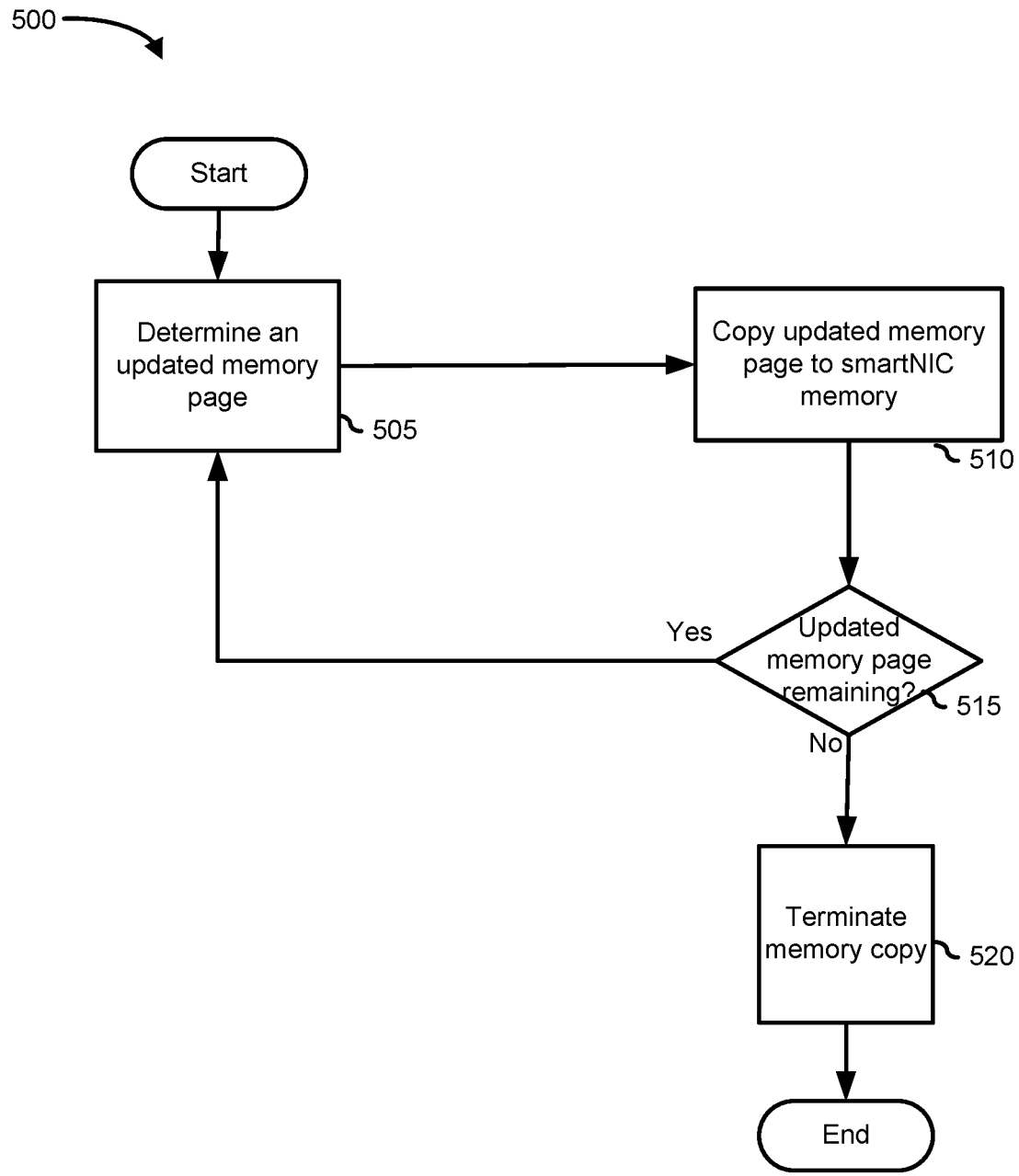
FIG. 5 is a flowchart illustrating an example of a method for copy phase of shadow live migration over a smartNIC, according to an embodiment of the present disclosure.

FIG. 5 shows an example of a method 500 for shadow live migration over a smartNIC. Method 500, which is a copy phase period of the shadow live migration, may be performed by smartNIC 230 of FIG. 2. While embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

Method 500 typically starts at block 505 where the smartNIC monitors for an updated memory page associated with a virtual machine by checking whether there is a dirty page indicated at a bitmap. After determining that there is an updated memory page, the smartNIC copies or mirrors the updated memory to a memory associated with the smartNIC at block 510. The smartNIC may verify that the memory page does not have an error prior to copying it to the smartNIC memory. The method then proceeds to decision block 515 where the method determines whether there is an updated memory page remaining to be copied with the memory associated with the virtual machine. If there is an updated memory page to be copied, then the "YES" branch is taken and the method proceeds to block 505. If there is no updated memory page to be copied, then the "NO" branch is taken and the method proceeds to block 520 where the method terminates the memory copy.

Figure 6:
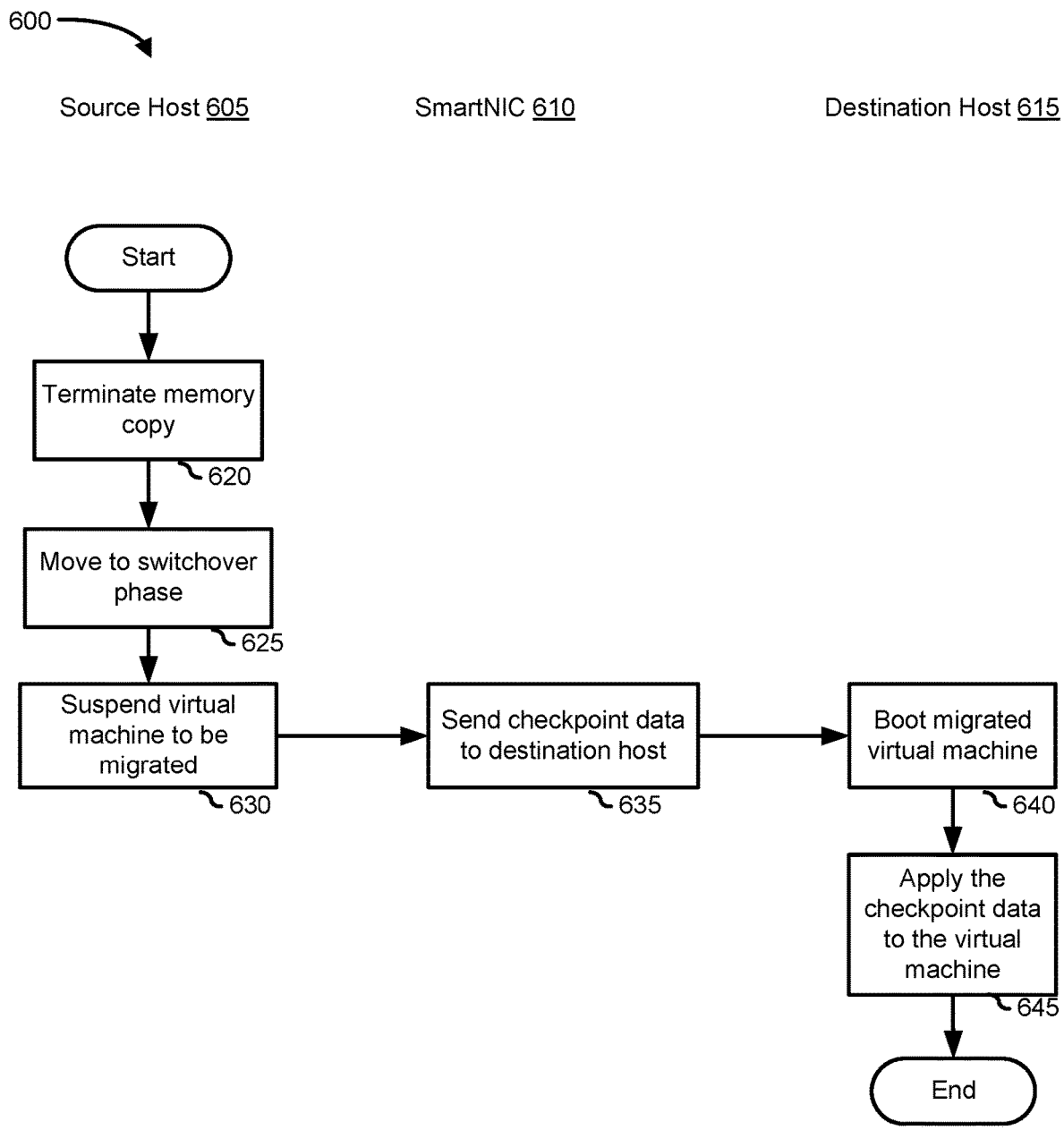
FIG. 6 is a flowchart illustrating an example of a method for a copy phase of shadow live migration over a smartNIC, according to an embodiment of the present disclosure.

FIG. 6 shows a method 600 for shadow live migration over a smartNIC. Method 600 may be performed by a source host 605, a smartNIC 610, and a destination host 615. Source host 605 is similar to source host 205, smartNIC 610 is similar to smartNIC 230, and destination host 615 is similar to destination host 250 of FIG. 2. One of skill in the art will appreciate that this flowchart explains a typical example, which can be extended and/or modified to advanced applications or services in practice.

Method 600 typically starts at block 620 where source host 605 or in particular a hypervisor terminates memory copy performed during the copy phase similar to method 500 of FIG. 5. Source host 605 may terminate the memory copy when an instruction to terminate the memory copy is received, the hypervisor or source host encounters a failure, an instruction to proceed to switchover phase is received, etc. Method 600 may also temporarily suspend memory copy when all the updated memory pages have been copied or mirrored to the memory associated with smartNIC 610.

At block 625, the method proceeds to a switchover phase, wherein the virtual machine is to be migrated from source host 605 to destination host 615. Various options may be performed at this phase such as removing memory pages associated with the virtual machine in the local memory, etc.

At block 630, the method suspends or powers off the virtual machine in preparation for migration and sends checkpoint data to destination host 615 at block 635. The checkpoint data includes the memory data and machine state of the virtual machine to be migrated at destination host 615. At block 640, the migrated virtual machine is booted and the checkpoint data is applied during boot at block 645. At this point, the virtual machine at the source host is replicated at the destination host.

Although the system and method in the present disclosure show examples of performing a shadow live migration of a virtual machine, the shadow live migration may be performed for any suitable computer resource, including computer resources other than virtual machines, such as application programs, dockers, containers, etc. In particular, the shadow live migration process may be performed on processes with their address space identifier in the operating system such as a container or an application process. In addition, shadow live migration does not require the smartNIC to be in the destination host. In particular, the smartNIC may be included both the source and destination hosts or in the source host.

Although FIG. 3, FIG. 5, and FIG. 6 show example blocks of method 300, method 500, and method 600 in some implementation, method 300, method 500, and method 600 may include additional blocks, fewer blocks, different blocks, or differently arranged blocks than those depicted in FIG. 3, FIG. 5, and FIG. 6. Additionally, or alternatively, two or more of the blocks of method 300, method 500, and method 600 may be performed in parallel. For example, block 625 and block 630 of method 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   subsequent to enabling asynchronous replication of a local host memory, monitoring, by a processor of an information handling system, the local host memory for an update to a memory page in the local host memory, wherein the local host memory is associated with a computer resource;
   subsequent to the update to the memory page, copying the memory page to a memory associated with a smart network interface card;
   setting a watchdog timer to detect a failure in the information handling system that hosts the computer resource; and
   if the failure is detected, then coordinating with another smart network interface card in another information handling system and migrating the computer resource from the memory associated with the smart network interface card to another memory associated with the other smart network interface card in the other information handling system.

2. The method of claim 1, wherein the copying of the memory page includes copying machine states associated with the computer resource.

3. The method of claim 1, wherein the copying of the memory page is performed over a peripheral component interconnect-express interface.

4. The method of claim 1, wherein the smart network interface card has a power domain distinct from another power domain of the information handling system.

5. The method of claim 1, further comprising:
caching, by the smart network interface card, a latest memory copy of the computer resource.

6. The method of claim 1, further comprising:
directly accessing, by the smart network interface card, the local host memory via a compute express link.

7. The method of claim 1, wherein the computer resource is a virtual machine.

8. An information handling system, comprising:
a watchdog timer configured to detect a failure in the information handling system; and
a processor configured to:
subsequent to enablement of asynchronous replication of a local host memory, monitor the local host memory for an update to a memory page in the local host memory, wherein the local host memory is associated with a computer resource;
subsequent to the update to the memory page, copy the memory page to a memory associated with a smart network interface card; and
if the failure is detected by the watchdog timer, then coordinate with another smart network interface card in another information handling system and migrate the computer resource from the memory associated with the smart network interface card to another memory associated with the other smart network interface card in the other information handling system.

9. The information handling system of claim 8, wherein to copy the memory page includes to copy machine states associated with the computer resource.

10. The information handling system of claim 8, wherein to copy of the memory page is performed over a peripheral component interconnect-express interface.

11. The information handling system of claim 8, wherein the smart network interface card has a power domain distinct from another power domain of the information handling system.

12. The information handling system of claim 8, wherein the smart network interface card caches a latest memory copy of the computer resource.

13. The information handling system of claim 8, wherein the smart network interface card has direct access to the local host memory via a compute express link.

14. The information handling system of claim 8, wherein the computer resource is a container.

15. A non-transitory computer-readable medium including code that when executed causes a processor to perform a method, the method comprising:
subsequent to enabling asynchronous replication of a local host memory, monitoring the local host memory of an information handling system for an update to a memory page in the local host memory, wherein the local host memory is associated with a computer resource;
subsequent to the update to the memory page, copying the memory page to a memory associated with a smart network interface card;
setting a watchdog timer to detect a failure in the information handling system that hosts the computer resource; and
if the failure is detected, then coordinating with another smart network interface card in another information handling system and migrating the computer resource from the memory associated with the smart network interface card to another memory associated with the other smart network interface card in the other information handling system.

16. The non-transitory computer-readable medium of claim 15, wherein the copying of the memory page includes copying machine states associated with the computer resource.

17. The non-transitory computer-readable medium of claim 15, wherein the copying of the memory page is performed over a peripheral component interconnect-express interface.

18. The non-transitory computer-readable medium of claim 15, wherein the smart network interface card has a power domain distinct from another power domain of the information handling system.

19. The non-transitory computer-readable medium of claim 15, wherein the smart network interface card caches a latest memory copy of the computer resource.

20. The non-transitory computer-readable medium of claim 15, wherein the smart network interface card has direct access to the local host memory via a compute express link.

* * * * *